Sept. 29, 1942.     J. PÜSCHNER ET AL     2,297,245
MANUFACTURE OF NONMETALLIC SLIDING CLASP FASTENERS
Filed July 1, 1939     2 Sheets-Sheet 1
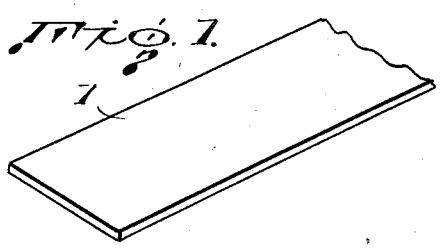
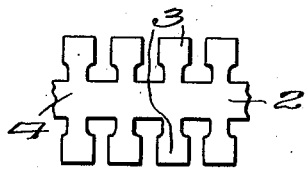
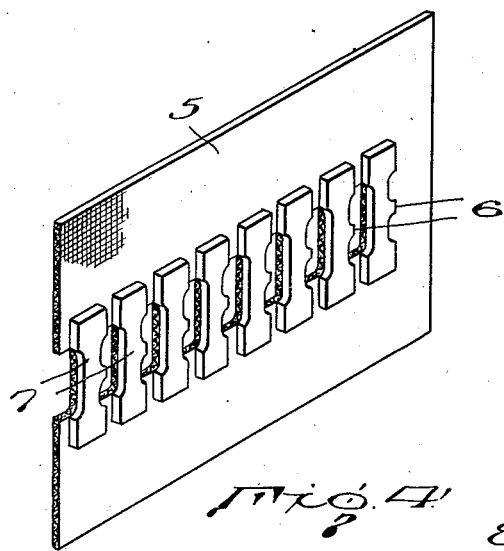
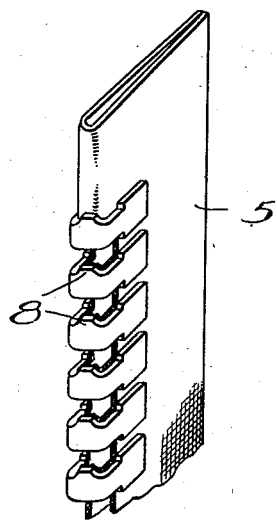
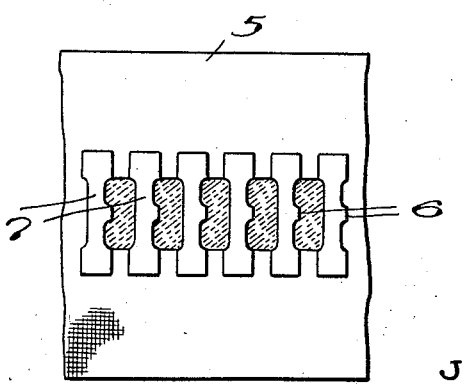
Inventors
JULIUS PUSCHNER
JOSEF PUSCHNER
By K. P. McElroy
Attorney Sept. 29, 1942.   J. PÜSCHNER ET AL   2,297,245
MANUFACTURE OF NONMETALLIC SLIDING CLASP FASTENERS
Filed July 1, 1939   2 Sheets-Sheet 2
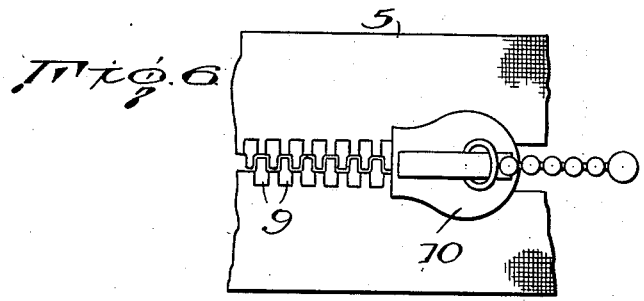
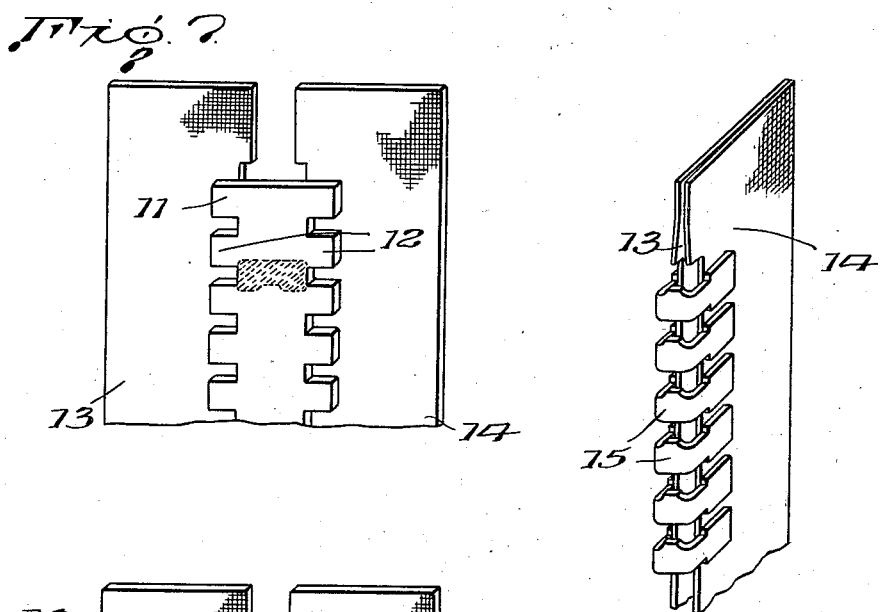
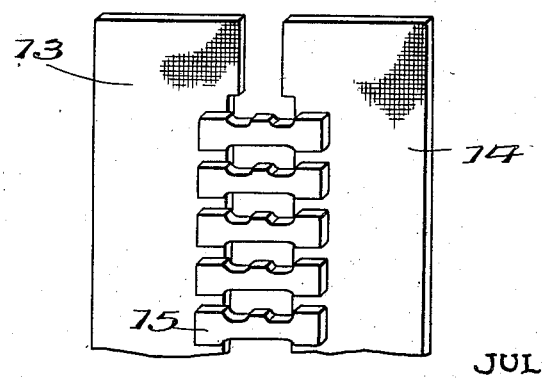
Inventors
JULIUS PUSCHNER
JOSEF PUSCHNER
By K. P. McElroy
Attorney Patented Sept. 29, 1942

2,297,245

UNITED STATES PATENT OFFICE 2,297,245

MANUFACTURE OF NONMETALLIC SLIDING CLASP FASTENERS

Julius Püschner and Josef Püschner, Sudetengau, Germany; vested in the Alien Property Custodian Application July 1, 1939, Serial No. 282,556 In Czechoslovakia July 14, 1938

11 Claims. (Cl. 18—59)

This invention relates to the production of sliding clasp fasteners in which the interlocking members consist of a non-metallic plastic material. Sliding clasp fasteners of this kind have been produced hitherto by forming the fastener members by stamping or carving operations, mounting them on the tape in a step by step manner, and then securing them to the tape by sticking with the aid of a solvent adapted to soften the surface of the preformed members. Sliding clasp fasteners of this kind have also been produced hitherto by moulding the interlocking members directly on to the edge of the mounting tape so that the members are formed and secured to the tape simultaneously in one single operation.

In the hitherto known processes where the fastener members are brought into association with the mounting tape step-wise and one at a time, it is necessary to use accurate mechanism for the purpose of ensuring the correct spacing of the members from each other. On the other hand, in processes where the members are formed by stamping or moulding in rows the spacing between the members is secured by the provision of accurate moulds or other forming mechanism, which may be of considerable length, e. g. up to several feet or more, and, moreover, the shape of the mould parts for forming each individual fastener member is necessarily highly complicated in order to generate members which are capable of interlocking.

The present invention has for its object the provision of a process for the manufacture of sliding clasp fasteners of non-metallic material which represents an improvement over the processes hitherto used in the art both in respect to speed and economy of operation and simplicity of apparatus required. It is a further object of the invention to provide a process for the manufacture of such fasteners in which the spacing between the members is automatically secured by a simple stamping or shaping operation, while avoiding the necessity of accurate assembling machines. Still further objects of the invention are to provide a novel intermediate product for use in the manufacture of sliding clasp fasteners and to provide novel sliding clasp fasteners of improved utility. Other objects of the invention will become apparent from the following description and drawings, in which—

Fig. 1 is a fragmentary perspective view of a blank strip from which the fastener element is formed;

Fig. 2 is a plan view showing a section of the strip after stamping;

Fig. 3 shows a portion of the strip applied to a fabric tape backing and with the web portions of the strip removed;

Fig. 4 is a perspective view showing the fastener elements secured to the fabric backing and with intervening portions of the fabric cut out;

Fig. 5 shows the spaced fastener elements bent to final shape;

Fig. 6 is a plan view of an assembled fastener;

Fig. 7 shows a modification wherein the partly formed fastener blank is secured to spaced backing strips;

Fig. 8 shows the blank of Fig. 7 centrally cut away to form spaced fastener elements;

Fig. 9 shows the completed form of modified fastener, bent to final U-shape.

The foregoing objects are achieved according to the present invention by securing a strip of non-metallic plastic material to a tape which is wider than the strip and extends laterally on each side of the strip, and conducting one or more cutting, stamping, moulding or other shaping operations or a combination of such operations on the strip and the tape wholly or partly either before, during or after their union in order to produce a ladder-like structure. This ladder-like structure consists essentially of a longitudinally slotted tape having a number of parallel rung-like elements of the non-metallic material extending across the slot, suitably in a direction substantially at right angles to the length of the slot, and secured to the material of the fabric (and optionally to each other) at each side of the slot. The parts of the non-metallic strip extending across the slot are so shaped that when the composite article is bent about its longitudinal axis they are either automatically or with the aid of a further shaping operation converted into individual fastener members. The strip may be partially stamped or cut to shape before it is secured to the tape and also, if desired, the longitudinal slot may previously be cut in the tape so that the strip of plastic material alone is subjected to a subsequent stamping or cutting operation. In this way the elements of the non-metallic strip extending across the slot may be free from any associated elements of the tape. The intermediate product consisting of the ladder-like strip and the tape is bent about its longitudinal axis into a U-shaped form with the non-metallic material on the outside of the U-bend so that the laterally extending portions of the tape are brought together. The fastener stringer so produced is a novel product in the art and consists of a row of partly or completely finished fastener members firmly secured to a double mounting tape. This construction is particularly desirable in that when the fastener stringers are to be secured to garments or other articles, the garment or other edge may be inserted between the two portions or wings of the mounting tape and sewn into position. In this way the strength of the union between the garment and the fastener stringer is considerably improved and a neat and pleasing finish is secured.

In one embodiment of our invention as illustrated in Figures 1-6 of the accompanying drawings a flat strip of non-metallic material of rectangular cross-section (Figure 1) is stamped out by means of blanking or cutting tools to form a strip 2 of partly finished fastener members 3 connected together by a centrally disposed stem portion 4 in the manner illustrated in Figure 2.

The strip thus formed is then firmly secured to a fabric tape 5 by means of an adhesive. The adhesive may be any common adhesive available in the art or in place thereof a solvent for the non-metallic material may be used, such solvent softening the surface of the non-metallic material and generating the adhesive thereon. Pressure is preferably applied to the contacting surfaces during the sticking operation in order to obtain a secure bond.

The tape and the strip are then subjected to a blanking or cutting operation whereby part of the stem portion 4 is cut away leaving a ladder-like structure of which the rung-like elements 7 have projections 6 (Figure 3). In the same operation that part of the tape 5 lying between the members, as indicated in shade lines in Figure 3, is also removed. This blanking operation thus produces an intermediate composite product having a ladder-like structure in which the stamped-out elements 7 have a backing of the fabric material 5. This intermediate product may, however, be prepared in a number of ways, for example individual partly finished members of the type indicated at 7 in Figure 3 may be attached to the tape in correctly spaced relationship by means of a sticking operation or by moulding the members directly on to the tape in a simple two-part mould, the requisite portion of the tape lying between the members being removed by means of a subsequent stamping operation. Alternatively a plain strip of plastic material may be secured to the tape by sticking or by moulding the strip directly to the surface of the fabric and the composite article subjected to a stamping or cutting operation to produce the intermediate product. In this case certain parts of the plastic material lying between adjacent members are required to be removed without cutting through the fabric material of the tape.

However prepared the intermediate product comprises a row of accurately spaced partly finished fastener members lying across a longitudinal slot extending along the length of the tape, each member being firmly secured to the tape at the sides of the slot by extensions which are preferably wider than the portion of the members lying within the slot. Each element of non-metallic material lying within the slot is preferably rectangular in form and is provided with a projection on one side mid-way across the slot. The members may optionally be secured to each other by a stem portion or spacing element which can be removed before or after bending into U form. The material of the fabric tape may or may not extend across the slot to form a backing for the whole of each member of plastic material.

The intermediate product, shown at this stage in Figs. 4 and 8, is then bent over along the longitudinal axis of the strip into a U form with the plastic material on the outside of the U bend in order to produce a series of spaced-apart finished fastener members and the laterally extending portions of the tape are brought together as shown in Figure 5 (see also Fig. 8). The plastic material is preferably heated during the bending operation. Alternatively the plastic material may be on the inside of the U-bend, and in this manner a fastener can be produced in which the fastener members are covered with fabric. The stringers thus produced are then assembled together in pairs as shown in Figure 6, so that the members form an interlocking row 9, an operating slider 10 being provided of conventional design.

In a second embodiment of our invention as illustrated in Figures 7, 8 and 9 of the accompanying drawings, the strip of non-metallic material is only secured at its edges to the two sides of the slot in the fabric tape. Optionally the slot may extend completely along the tape so that in effect the strip of non-metallic material is secured at its edges to two separate tapes. Thus between the tapes the non-metallic strip is free from any backing of the mounting tape.

As can be seen from Figure 7 a strip 11 of non-metallic material is provided with laterally extending teeth 12, and this strip is secured to two mounting tapes 13 and 14 as shown and in a manner similar to that described in the preceding embodiment of the invention. The strip of non-metallic material is then subjected to cutting or stamping operations in order to remove part of the material lying between the gaps on each side. One such segment of material removed is shown in the dotted lines in Figure 7, and as a result of such stamping or cutting operation there is generated a ladder-like composite intermediate structure illustrated in Figure 8. This is in every way similar to the composite intermediate structure of Figure 4, with the exception that the rung-like members extending across the longitudinal slot are not provided with a backing of the mounting tape. The composite strip is then bent into a U-shaped form about its longitudinal axis so that the elements 15 are converted into the form of fastener members while the two mounting tapes 13 and 14 are brought together. The folded structure is shown in Figure 9 with the non-metallic material lying on the outside of the U-shaped bend, although in this and any other embodiment of the invention it will be understood that the material can also be folded in the opposite direction so that the non-metallic material lies on the inside of the U-shaped band. The folded structure shown in Figure 9 constitutes a single fastener stringer, and this is assembled together with a similar stringer and with a slider in known manner. In this embodiment of the invention illustrated in Figures 7, 8 and 9 there are attained the advantages that the stamping or cutting of the non-metallic material is more easily effected, since there is no backing of the mounting tape, and also the risk of fraying of the edges of the mounting tape in the finished product is avoided.

It will be understood that this invention is not limited to the particular form of fastener members illustrated in the accompanying drawings since the transverse rung-like elements can be modified in shape so as to give rise to other forms of fastener members when they are bent about the longitudinal axis of the composite strip. Thus, for example, the invention may be adapted for the production of T-shaped fastener members by providing projections on both sides of the rung-like members, and these projections may be displaced to one side or the other of the central longitudinal axis of the composite strip. It is also possible to modify the shape of the members so that the two stringers to be assembled are not identical but are matched so that the projections on the one correspond with suitable recesses of the other. In general, it will be understood that any convenient or known form of fastener member may be adopted in carrying out the present invention provided that the member can be generated by folding a suitably shaped flat strip in a U-shaped manner.

The non-metallic material used in accordance with the present invention for constructing the fastener members is preferably a thermoplastic composition and more particularly a cellulose derivative composition containing conventional ingredients in addition to the cellulose derivative, namely plasticizers, softeners, fillers, pigments, dyestuffs and the like. The cellulose dirivative may, for example, be cellulose nitrate, cellulose acetate or other cellulose ester or vinyl cellulose or glycol cellulose or other cellulose ether. Vulcanised rubber compositions, for example of the vinyl type, may also be employed and also synthetic resin compositions, for example compositions containing vinyl resins, acrylate or methacrylate resins or styrene resins.

This invention is not limited to the particular embodiment in which the non-metallic material is stuck to the mounting tape, but it may also be secured thereto in other ways, for example by moulding the non-metallic material in situ on to the mounting tape or by securing it thereto by sewing, clamping, riveting or the like.

As many apparently widely different embodiments of this invention may be made without departing from the spirit and scope thereof, it is to be understood that the invention is not limited to the specific embodiments thereof except as defined in the appended claims.

We claim:

1. A process of making tape-mounted sliding clasp fasteners out of an organic plastic material capable of being bent to shape and of retaining the shape after bending, comprising the operations of removing such portions of an elongate blank of such a material as to form a series of separate transversely extending fastener elements each having a central fastener-engaging portion, securing at least the end portions of said series of elements to elongate tape means the width of which is greater than the transverse extent of the fastener means, and bending the series of elements about the central longitudinal axis of the tape means into substantially U-shape with folding of the remote edges of the tape means into closely spaced relation for reception of a web therebetween.

2. A process of making tape-mounted sliding clasp fasteners out of an organic plastic material capable of being bent to shape and of retaining its shape after bending, comprising the operations of attaching the edges of a ladder-like series of partially formed fastener elements to a pair of parallel spaced tapes, bending the series of elements into substantially U-shape and bringing the tapes into close spaced relation for attachment of a web, and at some stage of the process removing such portions of the series of elements as to produce in the finished assemblage separate spaced U-shaped fastener members with fastener-element engaging means at the bend thereof.

3. A process of making tape-mounting sliding clasp fasteners from an organic plastic material capable of being bent to shape and of retaining its shape after bending, comprising the operations of securing to elongate tape means a series of spaced strips of such a material each strip having a fastener-engaging projection extending midway of one side thereof, and bending the series of strips into substantially U-shape about an axis extending through said projections, with bringing of the remote edges of the tape means in close opposition for attachment to a web.

4. A process of making tape-mounted sliding clasp fasteners from an organic material capable of being permanently deformed and of retaining its new shape when deformed, comprising the operations of securing to elongate tape means a unitary strip of such a material having a series of opposite notches along each edge, cutting out pieces of the strip in the shape of oblongs of long axes parallel to the axes of said notches with indentations centrally thereof whereby to produce a series of separate fastener strips with a projection at the middle of each strip, and bending the series of strips attached to the tape means about an axis through said projections, into substantially U-shape.

5. A process as claimed in claim 1 in which the plastic material is thermo-plastic and bending is carried out at an elevated temperature.

6. A sliding clasp fastener stringer comprising a row of spaced fastener members of an organic plastic material bent in substantially U-shape and each having a projection at the bend to engage the bend of the next fastener member of the row, and secured adjacent the ends of the members to a double mounting tape adapted to receive between the two parts thereof the edge of a fabric which is to be held by the fastener stringer, the double mounting tape and ends of the fastener members being sufficiently spaced to permit insertion of such fabric to a point between the ends of the fastener members.

7. The matter of claim 6 wherein the double mounting tape is in one piece and is formed of a single tape folded about its longitudinal axis and is apertured between the fastener members.

8. The matter of claim 6 wherein the U-shaped fastener members are secured to the double mounting tape at all points over the inner surfaces of the fastener members.

9. The process of claim 1 wherein the tape means comprises two tapes laterally spaced apart.

10. In processes of making tape-mounted sliding clasp fasteners from sheeted organic plastic material capable of being bent to shape and of retaining the shape to which it is bent, in which a series of fasteners of such material at some stage of completion is adhesively secured to elongate tape means of width greater than the lateral extent of the fasteners, the step which comprises bending the series of fasteners at some stage of completion and while secured to the tape means, about the central longitudinal axis of the tape means into substantially U-shape, with folding of the remote edges of the tape means into close opposition to receive edges of webs which are to be fastened by the fasteners.

11. As an article of manufacture for use in the manufacture of tape-mounted sliding clasp fasteners which fasteners exhibit a U-shape in a plane at right angles to the plane of the tape-mounting tape means, a ladder-like substantially flat row of partially completed fastener elements of sheet organic plastic material, secured to one side of the tape means, the width of the row being less than the width of the tape means, and the thickness of the sheet material being so small relative to said width as to permit bending over of the flat row into U-shape about the central longitudinal axis thereof to bring the outer margins of the tape means in opposed parallel relation to each other.

JULIUS PÜSCHNER.
JOSEF PÜSCHNER.